US011522711B2

(12) United States Patent
Clements

(10) Patent No.: US 11,522,711 B2
(45) Date of Patent: *Dec. 6, 2022

(54) SYSTEMS AND METHODS FOR BLOCK CHAIN AUTHENTICATION

(71) Applicant: SECUREWORKS CORP., Wilmington, DE (US)

(72) Inventor: Thomas Clements, Kennesaw, GA (US)

(73) Assignee: Secureworks Corp., Wilmington, DE (US)

( * ) Notice: Subject to any disclaimer, the term of this patent is extended or adjusted under 35 U.S.C. 154(b) by 299 days.

This patent is subject to a terminal disclaimer.

(21) Appl. No.: 17/034,504

(22) Filed: Sep. 28, 2020

(65) Prior Publication Data

US 2021/0014067 A1    Jan. 14, 2021

Related U.S. Application Data

(63) Continuation of application No. 15/795,804, filed on Oct. 27, 2017, now Pat. No. 10,790,982.

(51) Int. Cl.
*H04L 9/40* (2022.01)
*H04L 9/32* (2006.01)
(Continued)

(52) U.S. Cl.
CPC ............ *H04L 9/3239* (2013.01); *G06F 21/31* (2013.01); *G06F 21/34* (2013.01); *G06F 21/35* (2013.01);
(Continued)

(58) Field of Classification Search
CPC ..... H04L 9/3239; H04L 9/0643; H04L 63/08; H04L 63/12; H04L 63/123; H04L 63/06;
(Continued)

(56) References Cited

U.S. PATENT DOCUMENTS 9,832,022 B1    11/2017  Pedersen
10,169,937 B1    1/2019  Zwink et al.
(Continued)

OTHER PUBLICATIONS

Github, Inc.; https://github.com/blockstack-packages/blockchain-id-deprecated/wiki/Home; Oct. 15, 2015 (last edited).
(Continued)

*Primary Examiner* — Ghodrat Jamshidi
(74) *Attorney, Agent, or Firm* — Womble Bond Dickinson (US) LLP

(57) ABSTRACT

A system for providing secure authentication between a service provider and at least one user device having a storage. The system having a processor managed by the service provider, which processor manages authentication between the at least one device and the service provider. The processor is configured to generate a block including at least user account information upon receipt of an authentication request from the at least one device; apply a cryptographic hash function to the block to create a hash; transmit the hash to the at least one device for storage in the memory of the at least one device; and upon receipt of the hash, validate the hash prior to providing access to the service provider.

16 Claims, 6 Drawing Sheets

(51) Int. Cl.

| | | |
|---|---|---|
| *G06F 21/62* | (2013.01) | |
| *H04L 9/06* | (2006.01) | |
| *G06F 21/34* | (2013.01) | |
| *G06F 21/35* | (2013.01) | |
| *G06F 21/31* | (2013.01) | |
| *G06F 21/30* | (2013.01) | |
| *H04L 9/00* | (2022.01) | |

(52) U.S. Cl.
CPC .......... *G06F 21/629* (2013.01); *H04L 9/0643* (2013.01); *H04L 63/08* (2013.01); *H04L 63/12* (2013.01); *H04L 63/123* (2013.01); *G06F 21/30* (2013.01); *H04L 9/50* (2022.05); *H04L 63/06* (2013.01)

(58) Field of Classification Search
CPC ..... H04L 2209/38; G06F 21/31; G06F 21/34; G06F 21/35; G06F 21/629; G06F 21/30
See application file for complete search history.

(56) References Cited

U.S. PATENT DOCUMENTS

| | | | |
|---|---|---|---|
| 10,579,368 B2* | 3/2020 | Wisnovsky | H04L 9/3297 |
| 10,790,982 B2 | 9/2020 | Clements | |
| 11,165,862 B2 | 11/2021 | Austin et al. | |
| 2004/0019785 A1 | 1/2004 | Hawkes et al. | |
| 2014/0003606 A1 | 1/2014 | Birnbaum et al. | |
| 2014/0006785 A1 | 1/2014 | Shaliv et al. | |
| 2015/0113258 A1 | 4/2015 | Grieco et al. | |
| 2015/0220918 A1 | 8/2015 | Davis et al. | |
| 2015/0269570 A1 | 9/2015 | Phan et al. | |
| 2016/0212146 A1* | 7/2016 | Wilson | H04L 9/3297 |
| 2016/0283941 A1* | 9/2016 | Andrade | H04L 9/3247 |
| 2017/0208084 A1 | 7/2017 | Steelman et al. | |
| 2017/0208085 A1 | 7/2017 | Steelman et al. | |
| 2017/0214675 A1 | 7/2017 | Johnsrud et al. | |
| 2017/0308872 A1 | 10/2017 | Uhr et al. | |
| 2017/0366348 A1 | 12/2017 | Weimer et al. | |
| 2018/0101842 A1 | 4/2018 | Ventura et al. | |
| 2018/0115416 A1* | 4/2018 | Diehl | H04L 9/30 |
| 2018/0268436 A1* | 9/2018 | Sprague | G06Q 20/12 |
| 2018/0375668 A1 | 12/2018 | Diehl et al. | |
| 2019/0109717 A1 | 4/2019 | Reddy et al. | |
| 2019/0132131 A1 | 5/2019 | Clements | |
| 2019/0171849 A1 | 6/2019 | Assenmacher | |
| 2019/0179801 A1 | 6/2019 | Jang et al. | |
| 2019/0251296 A1* | 8/2019 | Maneval | H04L 63/0428 |
| 2019/0347433 A1 | 11/2019 | Chakravorty et al. | |
| 2020/0394309 A1 | 12/2020 | Angelo et al. | |
| 2021/0109797 A1 | 4/2021 | Zhou | |

OTHER PUBLICATIONS

Github, Inc.; https://github.com/blockstack-packages/blockchain-id-deprecated/wiki/Blockstore; Sep. 3, 2015 (last edited).

* cited by examiner

SYSTEMS AND METHODS FOR BLOCK CHAIN AUTHENTICATION

CROSS REFERENCE TO RELATED APPLICATION

This is a continuation of and claims the benefit of the priority filing date of previously filed, co-pending U.S. patent application Ser. No. 15/795,804, filed Oct. 27, 2017.

INCORPORATED BY REFERENCE

The disclosure and figures of U.S. patent application Ser. No. 15/795,804, filed Oct. 27, 2017, are specifically incorporated by reference herein for all purposes as if set forth in their entirety.

BACKGROUND

As the value and use of information continues to increase, individuals and businesses seek additional ways to process and store information, such as through an information handling system that processes, compiles, stores, or communicates information or data for business, personal, or other purposes. Technology and information handling needs and requirements can vary between different applications. Thus, information handling systems also can vary with regard to what information is handled, how the information is handled, how much information is processed, stored, or communicated, and how quickly and efficiently the information can be processed, stored, or communicated. Variations in information handling systems allow such systems to be general or configured for a specific user or specific use such as financial transaction processing, airline reservations, enterprise data storage, global communications, etc. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems also may be via networks that are wired, wireless, or some combination thereof.

Information handling systems can communicate with each other or with networked systems to facilitate the processing of events, such as communications over a network, online commercial transactions or financial management, and/or may allow a user to access a specific website or network, such as a social media website or a dating network. In addition, many common household items, such as refrigerators, thermostats, are now being manufactured as "smart appliances," some of which include systems for communication with information handling systems, i.e., to enable access manufacturer or other service provider websites or networks and to carry out their operations or functions and/or to receive system updates. For such communications, networked systems and associated information handling systems generally require some form of authentication or validation. Typically, before a user is allowed access to a secure website, network, or online service, the user generally will have to provide an authentication code, or other validation information, such as a user name, password, an authentication certificate, and/or other security information. User names and passwords generally may include alpha-numeric strings, and sometimes special characters, and are generally generated (or thought up) by the user. As a result, users generally must recall their passwords and/or user names from memory, often resulting in user-selected or user-generated passwords that are relatively short, simple, or rudimentary. Additionally, many users do not frequently change or modify their passwords and instead tend to use the same password to access one or more websites, networks, service providers, etc. for extended periods of time. What's more, users often write down their passwords down or store them in an unsecure location such as unsecurely on their computer or mobile phone, or even in an online private email account. As a consequence, user-selected/user-generated passwords are typically vulnerable and can be easily obtained or even guessed by malicious actors and since users also often use the same password for all or most of their authentication or validation requirements, if one of the user's accounts is compromised, all of their other accounts likewise will be compromised.

In addition, users generally are required to manually enter their passwords and/or user names into such information handling system(s) or device(s) each time they wish to log-in or access a particular website, network, or service. Some devices/information handling systems, however, do not have readily accessible keyboards or selectable input devices. As a result, users may have to toggle through and/or individually select each character or number from a list or graphic each time they wish to enter their authentication information user name and/or password, which can be a time consuming and frustrating process.

Accordingly, it can be seen that a need exists for systems and methods for authentication that enable generation of authentication or validation information as needed to provide a desired level of security, while providing a substantially easier, seamless authentication between a user's information handling system and a service provider, and that also can provide for detection of compromised authentication credentials for the user. The present disclosure addresses these and other related and unrelated problems in the art.

SUMMARY

Briefly described, in one aspect, the present disclosure is directed to a system and method for providing user authentication between a service provider and users requesting access, such as through the use of a mobile application or otherwise. In one aspect, a user can create user accounts, whereupon an initial block of a user identifiable block chain is created, including user account information, session information, etc., such as upon receiving an initial account activation or set-up request from the user. A cryptographic hash function can be applied to the initial block, and thereafter the hashed initial block will be transmitted or sent to the user in a responsive transmission for storage in a memory or other suitable storage of the user's information handling system or device. Upon receiving a user authentication request, for example, a login request or other authentication request, a responsive request can be sent to the user asking their device/system for the hashed block. Upon receipt of a hashed block from the user, a determination can be made as to whether the credentials received from the user are valid; for example, by comparing the received hashed block to the last hashed block sent to the user. If the hashed block is not valid, access to the secure site/system/account can be denied and an alarm or notice also can be provided indicating that the attempted user authentication has been denied. If the user's hashed block received is valid, the user may be allowed access to the website, service, etc., or otherwise be in communication with the service provider. Thereafter, a new block, including user information and new authentication information, will be generated/created with cryptic hash function further being applied to the new block, and the hash sent to the authorized user (e.g., their device or information handling system). These steps can be repeated each time the service provider receives additional user authentication requests.

In another aspect, the present disclosure is directed to a system for providing enhanced security and potential detection of improper or unauthorized access/log-ins for the authentication process between a service provider and at least one user device/information handling system having a processor and a storage or memory. The system generally will have at least one server or other suitable computing device having a processor and a memory, which server can be managed by a service provider and generally will be configured with programming operable to manage authentication between the at least one user device/information handling system and the service provider. In one example embodiment, the server can be configured to generate an initial and/or subsequent block(s) including account information, session information, and/or other suitable information upon receipt of an authentication request from the at least one device/information handling system operated by the user. The server further may be configured to apply a cryptographic hash function to the block to create a hashed block and to transmit the hashed block to the user's device/ information handling system for storage in its memory as part of an authentication block chain. When the user next requests access to the service provider, the last hashed block (or a series/chain of hashed blocks) of the authentication block chain can be further transmitted and/or requested, and upon receipt of such a last hashed block (or series/chain of hashed blocks), the hashed block can be provided for authorized access to the service provider system(s). The system further is generally configured to create a new hashed block after each authentication request by each user and add such a newly created hashed block to the authentication block chain, or at least to the previously created/ received hashed block, after which the updated, authentication block/block chain (with the new hashed block) will be transmitted back to the authorized user's device or information handling system.

As a result, it can be seen that the methods and systems of the present disclosure provide several advantages. For example, as previous blocks are added in the chain, an audit trail generally is created for all authentication requests, which will include compromised requests. Also, since a new block is created each time a user initiates authentication, authentication information is dynamic or constantly changing, thereby obviating repeats of authentication information as well as substantially increasing the difficulty for a malicious actor to guess or otherwise obtain the authentication information. The complexity of the authentication information further is increased, which can help minimize potential issues with compromised or weak passwords. Still further, if the user's account does become compromised, and even if a malicious or threat actor gains access, the user can be alerted and/or additional attempts to use the user's access can be substantially blocked and/or the account deactivated or locked due to the failure of subsequent, updated hashed blocks to match the hashed block information at the service provider, indicating an invalid block, and providing detection of unauthorized use of such credentials.

Various objects, features and advantages of the present disclosure will become apparent to those skilled in the art upon a review of the following detail description, when taken in conjunction with the accompanying drawings.

BRIEF DESCRIPTION OF THE FIGURES

It will be appreciated that for simplicity and clarity of illustration, elements illustrated in the figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
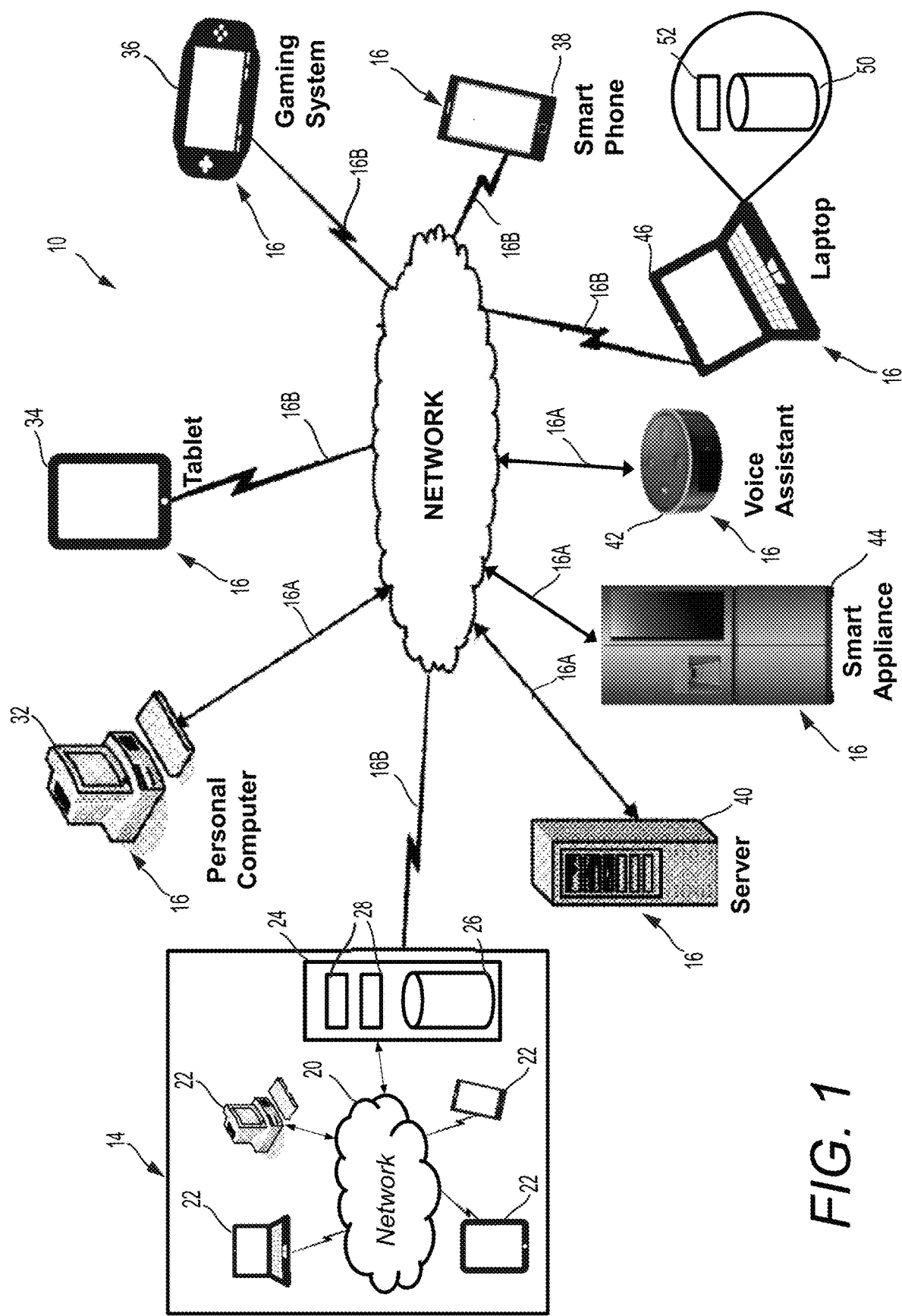
FIG. 1 is a block diagram of a network system of information handling systems according to principles of the present disclosure.

FIG. 1 is a block diagram of a networked system 10 of user and/or provider information handling systems 22/16, including various types of user devices or systems. As shown in FIG. 1, the system 10 generally will include a network 12, which can include an operations or control center 14 generally managed by a service provider. The control center 14 is communicatively coupled to the network 20, for example, through wireline connection 24, or through any other suitable connection, such as a wireless connection (e.g., WiFi, cellular, etc.). The network 12 further can be accessible to/by the one or more user information handling systems or devices 16 to facilitate communication between the user information handling systems or devices 16 and the service provider managed control center 14. The user managed information handling systems or devices 16 can be connected to the network through wired connections 16A, e.g., an Ethernet cable, or other suitable wired connections, or wireless connections 16B, e.g., WiFi, Bluetooth®, cellular connections (e.g., 3G, 4G, 5G LTE), other suitable wireless connections or combinations thereof (FIG. 1).

In one embodiment, the network 12, can include an Internet or cloud-based or another wide area network, a local area network, or a combination of networks, and may provide data communications among the service provider control center 14 and the user information handling systems 16. The control center 14 can be managed by the service provider can provide one or more online services to the users/operators of the user information handling systems 16. For example, the service provider can provide online banking services and/or other online financial transactions, such as E-Trading, online money exchanges or online currency service, etc.; online gaming services, such as access to a shared gaming network or gaming community website; social media or online dating services, such as Facebook®, Twitter®, Match.com®, etc.; online storage services, e.g., cloud-based storage of documents, audio files, photos (e.g., Google) Photos®), etc.; online retailers, such as Amazon®, WalMart®, or other online shopping E-commerce retailers; updates or maintenance for smart devices or smart appliances; and/or combinations thereof. The service provider is not limited to the example services/operations set forth above, however, and can include any suitable online or networked services, transactions, communications, operations, etc.

As further shown in FIG. 1, the service provider control center 14 further can include a data or information management system/center 18 that includes a network 20, such as a public or private network, that generally will be in communication with a plurality of internal information handling systems or devices 22 operable to manage and/or control operations or functions required to provide or facilitate the services provided by the service provider. The information handling systems 22 can include laptops, desktops, servers, mobile devices (e.g., mobile smart phones, tablets or PDAs), or other suitable devices or systems. In one embodiment, the management system/center 18 can include a server 24 having a storage or memory 26 and one or more processors 28 operable to provide operations management or systems handling of the control center 14 managed by the service provider.

The user information handling systems 16 (or 22) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, user information handling systems 16 may include a variety of devices or systems such as a personal computer 32 (e.g., a desktop or terminal), tablet 34, gaming system or console 36, mobile device 38 (e.g., personal digital assistant (PDA) or smart phone), server 40 (e.g., blade server or rack server), a voice assistant 42 (e.g., Amazon Echo®, Google Home®, etc.), a smart appliance 44 or laptop 46 and/or any other suitable device or system that may vary in size, shape, performance, and/or functionality. In one embodiment, the information handling systems 12 may include a storage 50, such as random access memory (RAM) or (ROM), one or more processing resources such as a central processing unit (CPU) 52 or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling systems also may include one or more buses operable to transmit communications between the various hardware components.

The service provider generally will require that the users/operators of the user information handling systems/devices 16 be authenticated/validated prior to initiating communication therewith and/or providing access to its services thereto. One or more of the processors 28 of the server 24 at the data/operations center may be operable to control validation/authentication between the service provider and the user-operated handling systems. Any of the information handling systems 22 of the control center 14, however, at least in part may control authentication/validation without departing from the present disclosure. Further, the information handling systems 16 may be provided, run, and/or access one or more components of a system, platform, program, workflow, etc. to facilitate control of the authentication process/method. In one example embodiment, the service provider will employ a block chain authentication method, process or workflow, wherein the server 24 can generally update and maintain a list of blocks (i.e., a block chain) associated with each authorized user and/or their identifier accounts, with one or more successive blocks of the chain containing of a previous block or blocks or a hash thereof, a time the user logs in, and/or other appropriate information. For example, the server provider generates a new block each time a user initiates authentication, which block can record and include specific information about the session as appropriate (for example, the source IP address, time, and a previous block or blocks). The block can then be hashed to excerpt and/or apply a unique sequence or feature, for example, a unique string, after which the hashed block (or a selected chain/series of hashed blocks) will be sent to the identified user for later validation as an authentication mechanism, such that each time the user attempts to access their account, as part of the user's authentication credentials (e.g., Identity, Password, Certificate, oath token, etc.), session information, at least the last authentication block hash also will be transmitted or provided. Upon an authentication request by/from the user, if the received hashed block is determined to be valid, a new block is created/hashed and the cycle starts over.

As a result, as one or more blocks and/or hashes thereof are added in the authentication block chain each time a user initiates authentication, an audit trail can be created for such authentication requests, which also can include a record of compromised requests. In addition, since a new block is created each time a user initiates or attempts to initiate authentication, authentication information is dynamic or constantly changing, thereby obviating repeats of authentication information as well as substantially increasing the difficulty for a malicious actor to guess or otherwise obtain the authentication information. The complexity of the authentication information further is increased by such dynamic changes, which also can help minimize effects of compromised or weak passwords. For example, if the malicious or threat actor does gain access, subsequent access by such actor can be blocked due to their not having or being able to provide the updated/next hashed block in the authentication block chain, and/or the authorized user attempting access with an incomplete chain the result of which can be to cause or generate a lockout/hold on the account and/or an alarm. Authentication between the service provider and the user further can be made substantially seamless to an extent the user may store or otherwise may not be required to generate or remember their password or enter their password and/or username each time they attempt to access one or more selected service provider(s).

Figure 2:
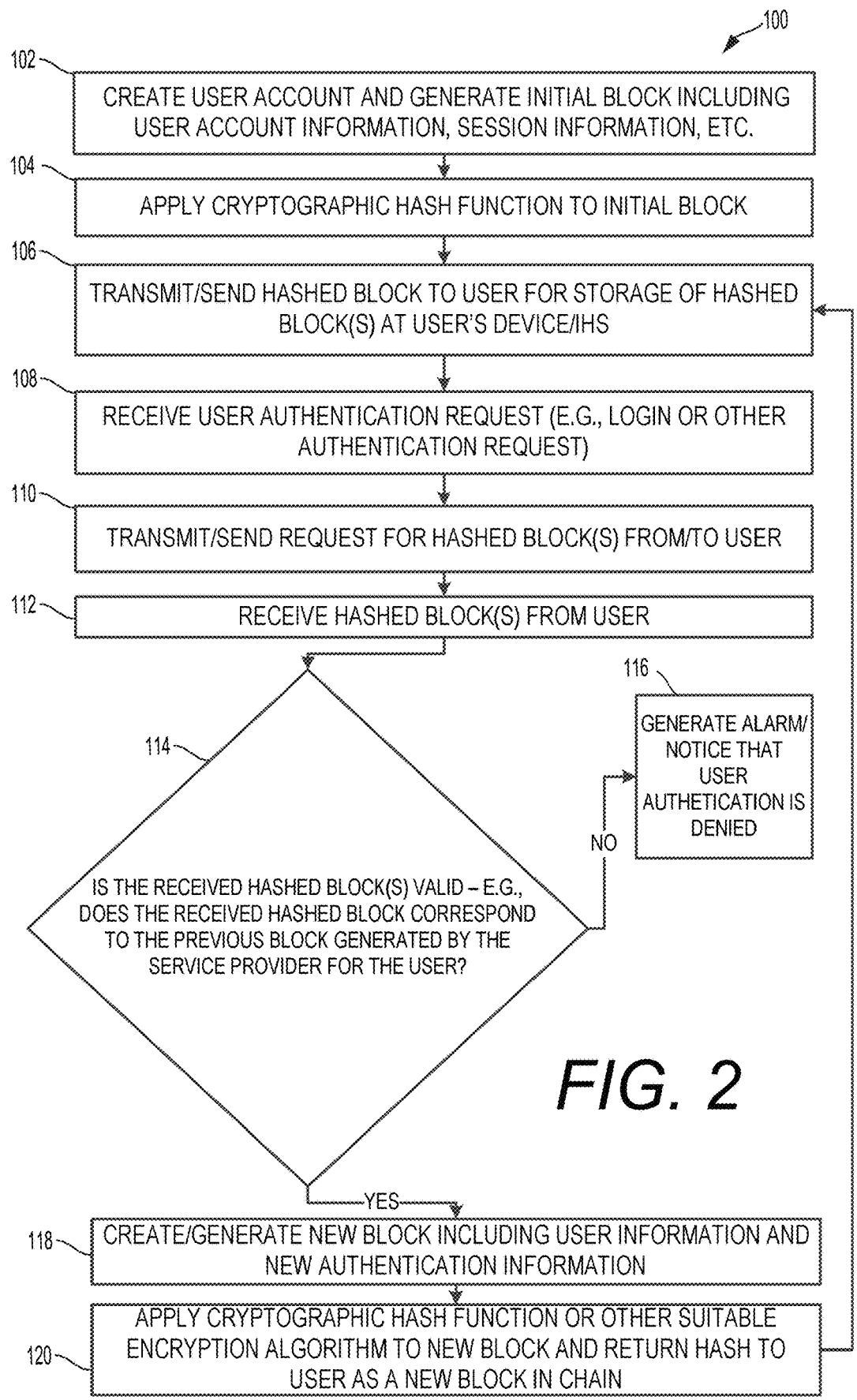
FIG. 2 is a flow diagram illustrating a method or process for secure authentication according to one aspect of the present disclosure.

FIG. 2 shows a block chain authentication method or process 100 according to principles of the present disclosure. As shown in FIG. 2, in response to or upon receipt of an initial access or account set-up request from a user, for example, to allow the user's information handling system 16 to communicate with or otherwise access the services provider's networks/systems or services, the server 24 may create a user account and also generate an initial block including user account information, session information (e.g., access or login time, etc.), other information about the user, e.g., an IP or MAC address, and/or any other suitable information. For example, in one embodiment, the initial block can include identification information associated with the initial block, such as a number or other identifier, a user name or other user information, nonce or other random or arbitration information or data, such as a random string, for use with the initial block, session information, e.g., the date and time that the user requested access or account set-up and/or a date and time at which the initial block was generated after coded identifiers and/or other suitable information or combinations thereof. The user information can include, for example, an identifier for the user, such as a user name, a coded identifier, a certificate, or an oath token, etc., though any suitable identifying information can be used without departing from the present disclosure.

In Step 104, the server 24 will apply a cryptographic hash function, or other suitable cryptographic function, to the initial block, and transmit or send the hashed initial block to the user for storage of the hashed initial block in the storage or memory 50 of the user's information handling system (Step 106). Accordingly, when the server 24 receives a user authentication request, for example, when the user is attempting to log in or otherwise get access to the service provider's services (at Step 108), the server 24 may transmit or send a request for the initial hashed block to the user at Step 110. When the server 24 receives the hashed block from the storage 50 of the user's information handling device 16 (Step 112), the server 24 can then determine whether the credentials, e.g., the initial hashed block or other blocks and/or information contained therein, received from the user are valid (Step 114). For example, the server 24 may compare the received hashed block or hashed block chain from the user with a hash of the previous block or block chain that was sent or returned to the user after the last authenticated/validate login by the user.

As further shown in FIG. 2, if the credentials are not valid, the server 24 may generate an alarm that authentication has been denied and may send the notice to the information handling system requesting authentication or access to the service provider (Step 116). If an attacker gets the hash, identity and authentication data, they may be able to log in, and they could receive the new hash for the new block, which would thus invalidate the real users last block. The user would get either locked out or receive the error alarm or notification that their chain has been altered and must contact support for remediation. Further, by looking at the last block or block chain, support potentially could be able to see the source of the attack, and further could then roll back to the previous block or create a new block or new chain, giving the real user access again and invalidating the attacker's access and making it substantially more difficult for them to try to again gain access to the user's account.

If the credentials are valid, however, the server 24 will generally allow for communications with or grant access to the user's information handling system 16, and also will create or generate a new block that includes user or session information (Step 118). For example, the new block may also include information indicating the time at which access was granted or communications were initiated (e.g., a login time), as well as source information, such as an IP address, MAC address, or other identifier for the information handling system. At Step 120, the server applies the cryptographic hash function, or other suitable encryption algorithm or function, to the new block or block chain including the new block and transmits the new hashed block or block chain to the user for storage in its memory 50. Each block chain generally may include the new block and the previous block, though any number of blocks can be included without departing from the present disclosure.

In response to receiving additional authentication requests from the user, the server will repeat steps 110 through 120 and further will repeat these steps for all subsequent authentication requests.

Figure 3:
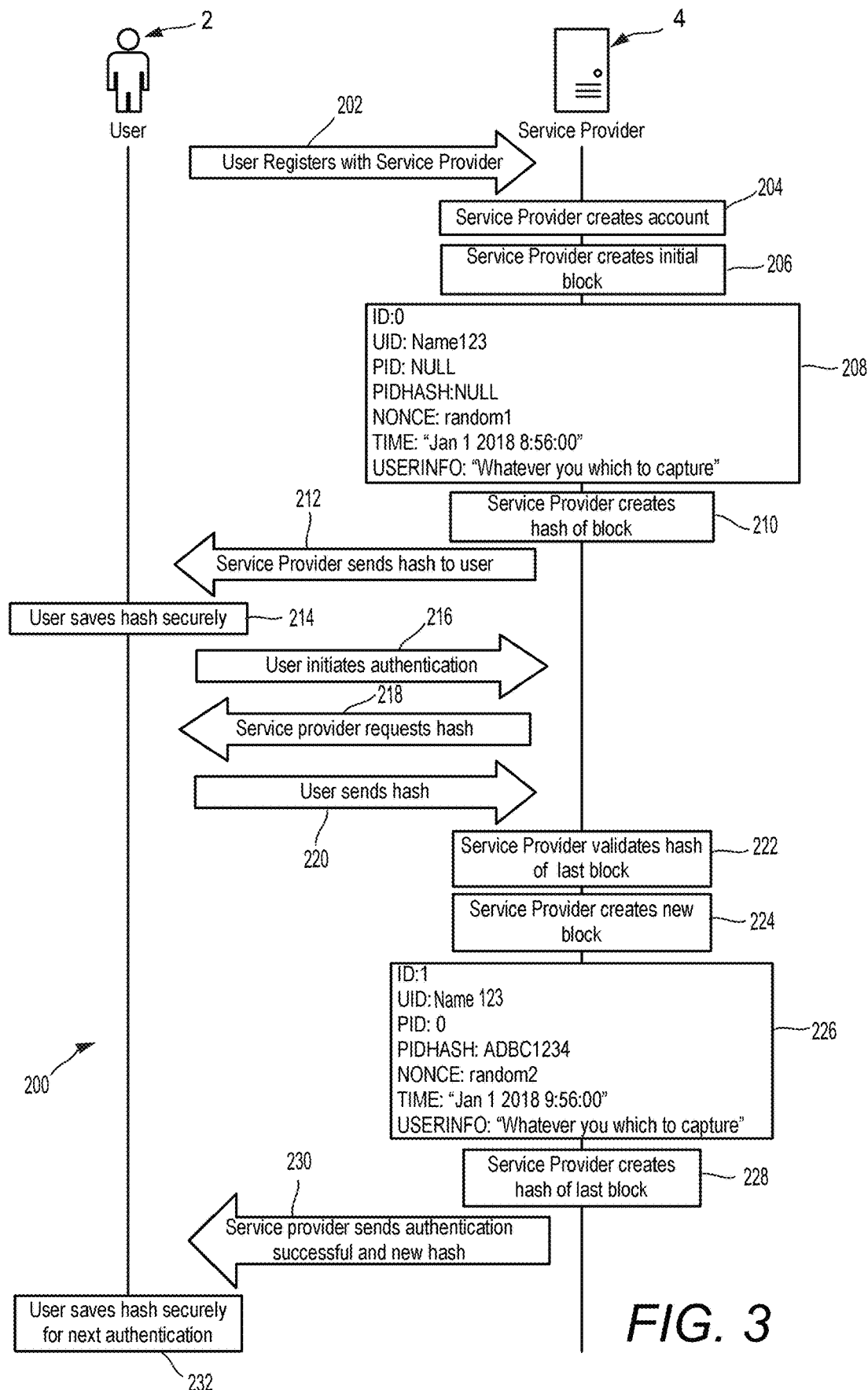
FIG. 3 shows a timeline of a sequence of events with the method or process of FIG. 2.

FIG. 3 illustrates a timeline 200 of a sequence of events. Timeline 200 includes events 202 through 232. At 202, a user 2 may register with the service provider 4. The service provider 4 may then create one or more accounts associated with the user (204), and at the same time, create an initial block (206). As shown at 208, the initial block can include, for example, an identification (ID) of the block, a cryptic cache of the previous block, ID of the previous block, nonce or random data, a time block of creation of the block, other user information desired to be captured or other suitable information. As further shown in FIG. 3, for the initial block, the cryptic cache of the previous block (PID) will be null as no previous block has been created. The service provider may then create a hash of the block (210), and the service provider can then send the hash of the block to the user. The user can save the hash securely, for example, in the memory 50 of the information handling device.

When a user later initiates authentication as shown at 216, the service provider 4 can request the hash (218) and in response the user can send the hash (220). The service provider 4 can then validate the hash of the last block (222), and if the hash is validated, the service provider can create a new block at 224. The information included in the new block is shown at 226, and will generally include an identification (ID) of the block, a cryptic cache of the previous block, ID of the previous block, nonce or random data, a time block of creation of the block, other user information desired to be captured or other suitable information. Then, the service provider 4 can create a hash of the new block (at 228) and send a notification that authentication was successful allowing a user access to the services of the service provider. The service provider also transmits the new hash of the last block, so that the user's device can save the hash securely for later authentication.

Figure 4:
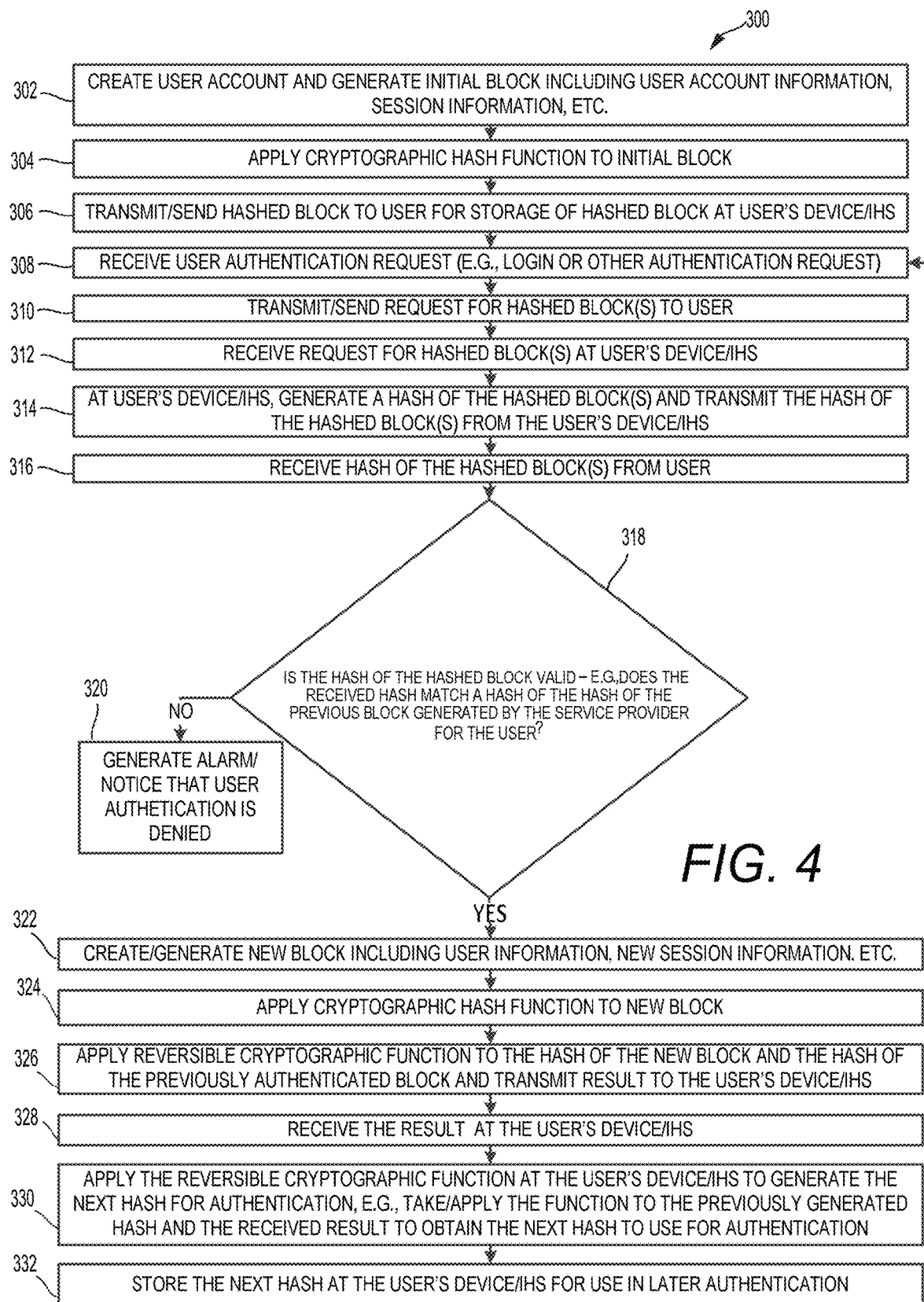
FIG. 4 is a flow diagram illustrating a method or process for secure authentication according to another aspect of the present disclosure.

FIG. 4 shows a block chain authentication method or process 300 according to another aspect of the present disclosure. Steps 302 to 310 in FIG. 4 generally correspond to Steps 102 to 110 in FIG. 2. As shown in FIG. 4, however, with the method or process 300, when the user's device or information handling system 16 receives the request for the hashed block(s) from the server 24 or service provider (at Step 312), the user's device or information handling system 16 also can generate a hash of the hashed block and transmit the hash of the hashed block to the service provider (Step 314). Upon receipt of the hash of the hashed block or blocks from the user (at Step 316), the server 24 will determine whether the credentials received from the user are valid; for example, the server 24 itself can hash the hash of the previous block that was sent to the user and determine whether this hash matches or generally corresponds to the returned hash of the hashed block received from the user (Step 318).

If the credentials received from the user are not valid, the server 24 may generate an alarm or notice to inform the user that authentication has been denied (Step 320).

If the credentials are determined to be valid, the server 24 may provide access to or otherwise initiate communication with the user's information handling system or device 16, and at Step 322, the server 24 will create or generate a new block including user information, session information and/or other suitable information. The server 24 then will apply a cryptographic hash function, or other suitable encryption algorithm/function, to the new block at Step 324. Additionally, the server can apply a reversible cryptographic function, such as an XOR function or other suitable reversible cryptographic function, to the hash of the new block and the hash of the previously authenticated block, and will thereafter transmit the result to the user's device or information handling system 326. When the user's device receives the result (at Step 328), the user's device/information handling system 16 then will apply the reversible cryptographic function to obtain the next hash for authentication. For example, the user's device/information handling system can apply the reversible cryptographic function to the previously generated hash and the result received from the server to generate a next hash for later authentication. At Step 332, the user's device/information handling system can securely store or otherwise save the generated/obtained next hash for use in a subsequent authentication.

Thereafter, in response to receiving additional authentication requests from the user, steps 308 through 322 generally will be repeated, and these steps can be repeated for all subsequent authentication requests.

Figure 5:
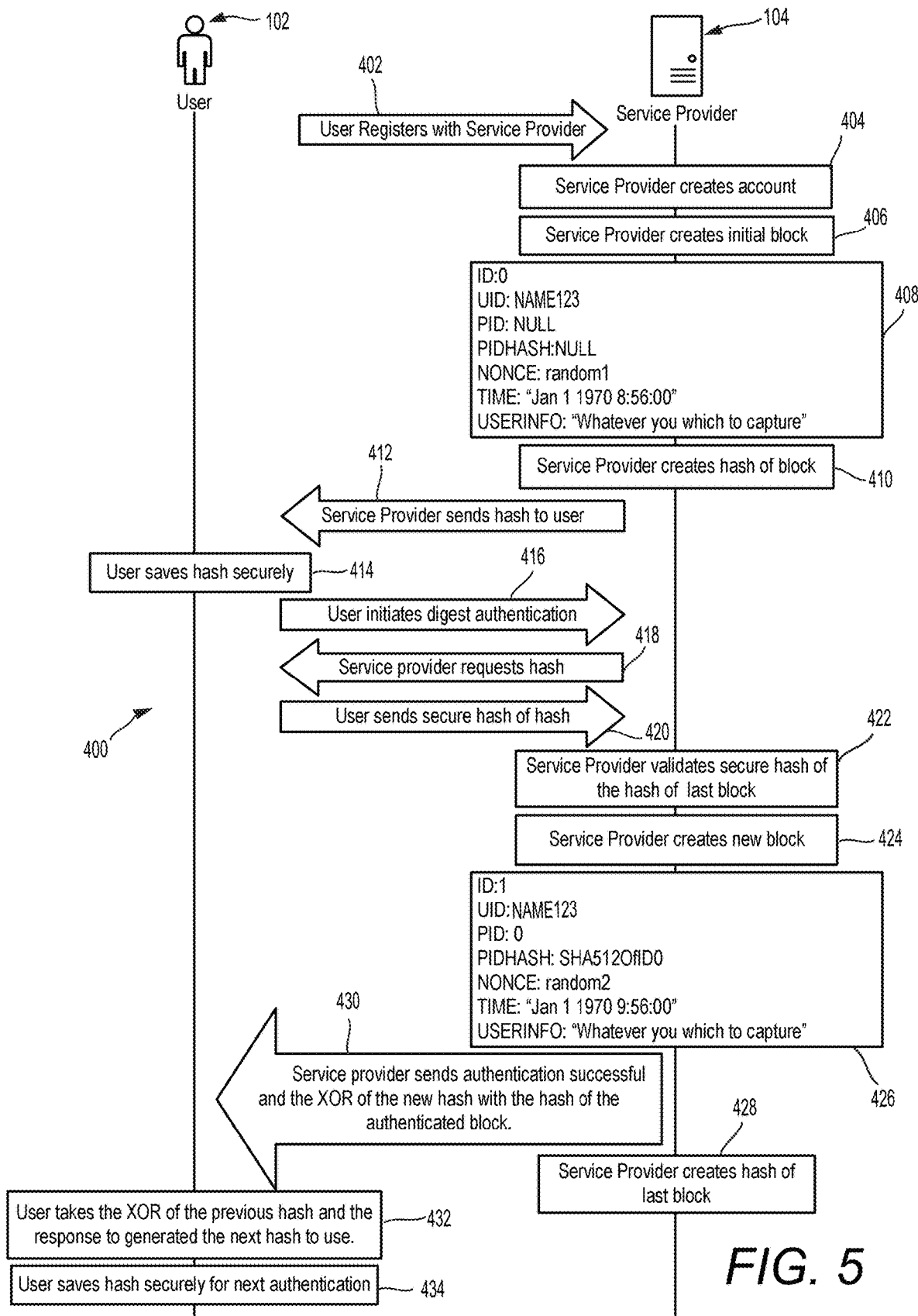
FIG. 5 shows a timeline of sequence of events with the method or process of FIG. 4.

FIG. 5 shows the sequence of events substantially similar to those of FIG. 3; however, in FIG. 5, at 420, when the user's device or information handling system 16 receives the requests for hashed blocks from the server 24 (sent in 418), the user's device or information handling system 16 will generate a hash of the hashed block and transmit the hash of the hashed block to the service provider (420). Then, upon receipt of the hash of the hashed block from the user, the server will validate the secure hash of the hashed block (422).

If the hash of the hashed block is valid, the server may provide access to or otherwise initiate communication with the user's information handling system or device, and create a new block. The new block at 426 generally will contain information similar to block 226 shown in FIG. 3. The server then will create a hash or new/last block (at 428), and at 430, the server also will apply a reversible cryptographic function, such as an XOR function, to the new hash with the hash of the previously authenticated block and transmit the result to the user. The user or user's device/information handling system can then take the reversible cryptographic function of the previous hash and the result previously received from the service provider to generate the next hash to use for authentication (Step 432). At Step 434, the user can save the next hash securely for the next authentication.

Figure 6:
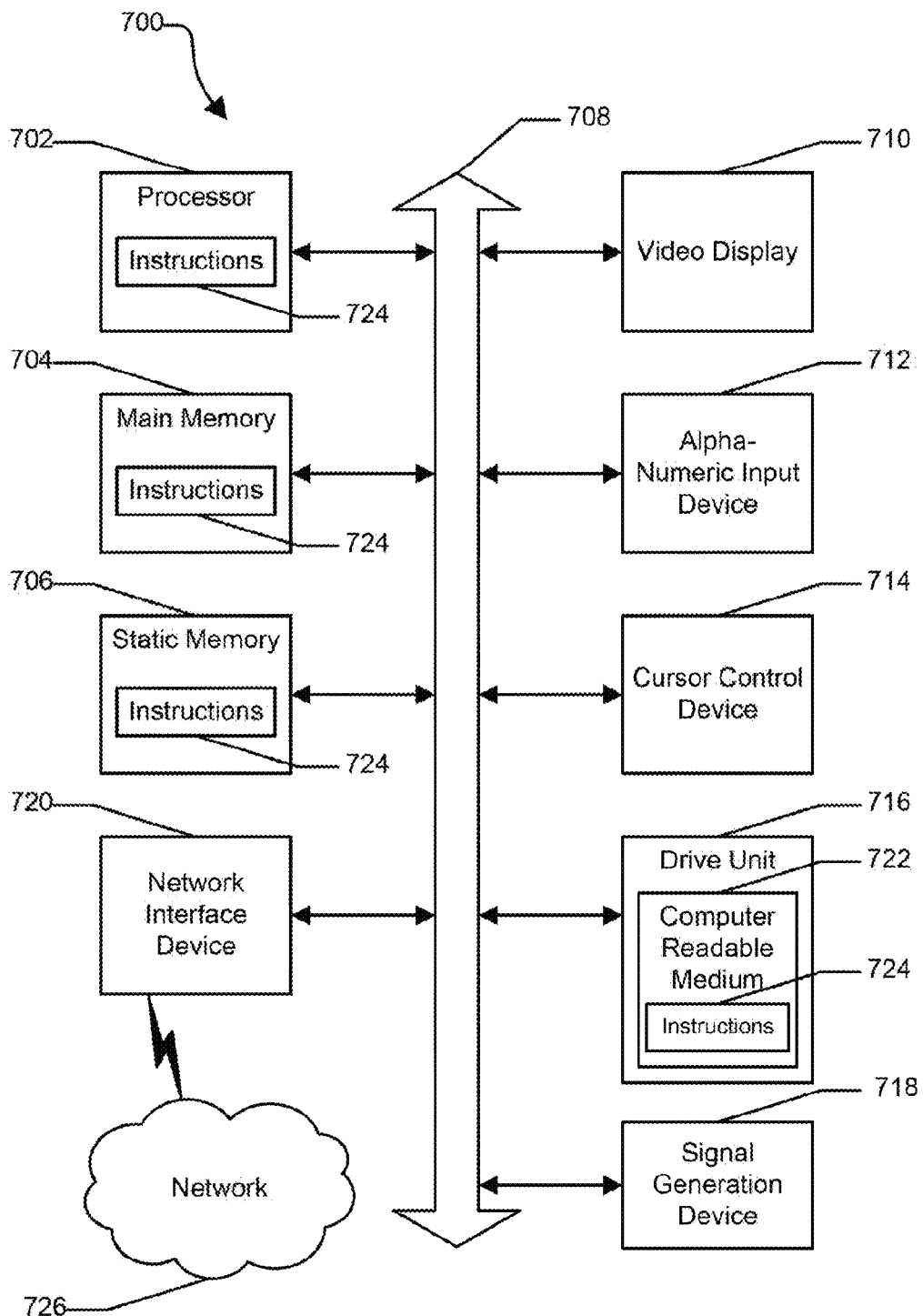
FIG. 6 is a block diagram illustrating an information handling system according to one example embodiment of the present disclosure.

FIG. 6 shows an example of an information handling system 700 capable of administering each of the specific embodiments of the present disclosure. The information handling system 700 can represent the user information handling systems 22, 32, and 40 of FIGS. 1 and 2. The information handling system 700 may include a computer system or processor 702 such as a central processing unit (CPU), a graphics processing unit (GPU), or both. Moreover, the information handling system 700 can include a main memory 704 and a static memory 707 that can communicate with each other via a bus 708. The information handling system 700 includes near-field communications (NFC) device and interface 718, such as an antenna and NFC subsystem. The information handling system 700 can also include a disk drive unit 716, and a network interface device 720. As shown, the information handling system 700 further may include a video display unit 710, such as a liquid crystal display (LCD), an organic light emitting diode (OLED), a flat panel display, a solid state display, or a cathode ray tube (CRT), or other suitable display. The video display unit 710 may also act as an input accepting touch-screen inputs. Additionally, the information handling system 700 may include an input device 712, such as a keyboard, or a cursor control device, such as a mouse or touch pad, or a selectable interface on the display unit. Information handling system may include a battery system 714. The information handling system 700 can represent a device capable of telecommunications and whose can be share resources, voice communications, and data communications among multiple devices. The information handling system 700 can also represent a server device whose resources can be shared by multiple client devices, or it can represent an individual client device, such as a laptop or tablet personal computer.

The information handling system 700 can include a set of instructions that can be executed to cause the processor to perform any one or more of the methods or computer based functions disclosed herein. The processor 702 may operate as a standalone device or may be connected such as using a network, to other computer systems or peripheral devices.

In a networked deployment, the information handling system 700 may operate in the capacity of a server or as a client user computer in a server-client user network environment, or as a peer computer system in a peer-to-peer (or distributed) network environment. The information handling system 700 can also be implemented as or incorporated into various devices, such as a personal computer (PC), a tablet PC, a set-top box (STB), a smartphone, a PDA, a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 700 can be implemented using electronic devices that provide voice, video or data communication. Further, while a single information handling system 700 is illustrated, the term "system" shall also be taken to include any collection of systems or subsystems that individually or jointly execute a set, or multiple sets, of instructions to perform one or more computer functions.

The disk drive unit 716 or static memory 714 may include a computer-readable medium 722 in which one or more sets of instructions 724 such as software can be embedded. The disk drive unit 716 or static memory 714 also contains space for data storage. Further, the instructions 724 may embody one or more of the methods or logic as described herein. In a particular embodiment, the instructions 724 may reside completely, or at least partially, within the main memory 704, the static memory 706, and/or within the processor 702 during execution by the information handling system 700. The main memory 704 and the processor 702 also may include computer-readable media. The network interface device 720 can provide connectivity to a network 726, e.g., a wide area network (WAN), a local area network (LAN), wireless network (IEEE 702), or other network. The network interface 720 may also interface with macrocellular networks including wireless telecommunications networks such as those characterized as 2G, 3G, 4G, 5G, LTE or similar wireless telecommunications networks similar to those described above. The network interface 720 may be a wireless adapter having antenna systems 732 for various wireless connectivity and radio frequency subsystems 730 for signal reception, transmission, or related processing.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations. In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 724 or receives and executes instructions 724 responsive to a propagated signal; so that a device connected to a network 728 can communicate voice, video or data over the network 728. Further, the instructions 724 may be transmitted or received over the network 728 via the network interface device 720. In a particular embodiment, BIOS/FW code 724 reside in memory 704, and include machine-executable code that is executed by processor 702 to perform various functions of information handling system 700.

Information handling system 700 includes one or more application programs 724, and Basic Input/Output System and Firmware (BIOS/FW) code 724. BIOS/FW code 724 functions to initialize information handling system 700 on power up, to launch an operating system, and to manage input and output interactions between the operating system and the other elements of information handling system 700.

In another embodiment (not illustrated), application programs and BIOS/FW code reside in another storage medium of information handling system 700. For example, application programs and BIOS/FW code can reside in drive 716, in a ROM (not illustrated) associated with information handling system 700, in an option-ROM (not illustrated) associated with various devices of information handling system 700, in storage system 707, in a storage system (not illustrated) associated with network channel 720, in another storage medium of the information handling system 700, or a combination thereof. Application programs 724 and BIOS/FW code 724 can each be implemented as single programs, or as separate programs carrying out the various features as described herein.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile, read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a consumer electronic device, a network server or storage device, a switch router, wireless router, or other network communication device, a network connected device (cellular telephone, tablet device, etc.), or any other suitable device, and can vary in size, shape, performance, price, and functionality.

The information handling system can include memory (volatile (such as random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method for providing user authentication between a service provider and a user requesting access to a user account, comprising:
   generating an initial user authentication block of a user identifiable block chain, including user account information associated with the user upon receiving an initial account activation or set-up request from the user;
   applying a cryptographic hash function to the initial user authentication block to create a hash of the initial user authentication block;
   sending the hash of the initial user authentication block to an information handling system of the user for storage in a memory of the information handling system;
   upon receiving a subsequent user authentication request from the information handling system of user, sending a request for the hash of the initial user authentication block from the information handling system;
   receiving a hash from the information handling system of the user, and validating the received hash in view of the hash of the initial user authentication block; and
   if the received hash from the information handling system is valid, establishing access between the information handling system and the user account.

2. The method of claim 1, further comprising generating an additional user authentication block including at least the hash of the initial user authentication block; applying the cryptographic hash function to the additional user authentication block to generate an additional hash; and sending the additional hash to the information handling system for storage in the memory to be used in a subsequent authentication request.

3. The method of claim 2, further comprising applying a reversible cryptographic function to the additional hash and the hash of the initial user authentication block; and sending a result of the application of the reversible cryptographic function to the information handling system, wherein the information handling system is operable to apply the reversible cryptographic function to the result to obtain a next hash for authentication.

4. The method of claim 2, wherein upon receipt of each subsequent authentication request from the information handling system, the method comprises:
   validating a hash received from the information handling system associated with the subsequent user authentication request,
   generating a subsequent user authentication block that includes at least a hash of a previous user authentication block;
   applying the cryptographic hash function to the subsequent user authentication block to generate a subsequent hash, and
   transmitting the subsequent hash to the information handling system of the user for storage in the memory to be used in a next authentication request.

5. The method of claim 1, wherein validating the received hash from the information handling system comprises comparing the received hash with the hash of the initial user authentication block, wherein the hash of the initial user authentication block is stored at the service provider.

6. The method of claim 1, further comprising generating and sending a notification to alert the user that the user identifiable block chain has been compromised if the received hash from the information handling system is not valid.

7. The method of claim 1, wherein the information handling system comprises a personal computer, a tablet, a gaming system, a smart phone, a laptop, a smart appliance, a server, or a voice assistant.

8. The method of claim 1, wherein the user authentication block includes a user name, user information, nonce or random data, session information, or combinations thereof.

9. A system for providing secure authenticated access of user accounts between a service provider and a user managed information handling system, the system comprising:
   a server managed by the service provider, the server comprising one or more memories storing instructions and one or more processors that manage authentication requests between the information handling system and the service provider, the one or more processors executing the instructions stored in the one or more memories, wherein the one or more processors execute the instructions to:
   generate an initial user authentication block of a user identifiable block chain, the initial user authentication block including at least user account information;
   apply a cryptographic hash function to the initial user authentication block to create a hash thereof;
   send the hash of the initial user authentication block to the information handling system for storage in a memory of the information handling system;
   upon receiving a subsequent user authentication request from the information handling system, requesting the hash of the initial user authentication block from the information handling system;
   receive a hash from the information handling system, and validate the received hash in view of the hash of the initial user authentication block; and
   if the received hash from the information handling system is valid, establish access between the information handling system and the user account.

10. The system of claim 9, wherein the one or more processors further are operable to: generate an additional user authentication block including at least the hash of the initial user authentication block; apply the cryptographic hash function to the additional user authentication block to generate an additional hash, and send the additional hash to the information handling system for storage in the memory to be used in a subsequent authentication request.

11. The system of claim 10, wherein the one or more processors further are operable to apply a reversible cryptographic function to the additional hash and the hash of the initial user authentication block; and send a result of the application of the reversible cryptographic function to the information handling system, wherein the information handling system is operable to apply the reversible cryptographic function to the result to obtain a next hash for authentication.

12. The system of claim 10, wherein upon receipt of each subsequent authentication request from the information handling system, the one or more processors are operable to:
   validate a hash received from the information handling system associated with the subsequent user authentication request,
   generate a subsequent user authentication block that includes at least a hash of a previous user authentication block;
   apply the cryptographic hash function to the subsequent user authentication block to generate a subsequent hash, and
   transmit the subsequent hash to the information handling system for storage in the memory to be used in a next authentication request.

13. The system of claim 9, wherein the one or more processors are further operable to compare the received hash from the information handling system with the hash of the initial user authentication block to validate the received hashed.

14. The system of claim 9, wherein if the received hash from the information handling system is not valid, the one or more processors are operable to generate and send a notification to alert the user.

15. The system of claim 9, wherein the information handling system comprises a personal computer, a tablet, a gaming system, a smart phone, a laptop, a smart appliance, a server, or a voice assistant.

16. The system of claim 9, wherein the initial user authentication block includes a user name, user information, nonce or random data, session information, or combinations thereof.

* * * * *